United States Patent
Watson

(10) Patent No.: US 9,400,509 B2
(45) Date of Patent: Jul. 26, 2016

(54) METHOD FOR HEATING AND/OR COOLING AGRICULTURAL RELATED FEED ADDITIVES

(76) Inventor: James B. Watson, Pierce, NE (US)

(*) Notice: Subject to any disclaimer, the term of this patent is extended or adjusted under 35 U.S.C. 154(b) by 1829 days.

(21) Appl. No.: 12/657,817

(22) Filed: Jan. 28, 2010

(65) Prior Publication Data
US 2011/0180156 A1    Jul. 28, 2011

(51) Int. Cl.
| | | |
|---|---|---|
| A01K 7/02 | (2006.01) | |
| G05D 23/19 | (2006.01) | |
| A01K 39/04 | (2006.01) | |
| A01K 9/00 | (2006.01) | |
| A23K 1/00 | (2006.01) | |
| F16L 53/00 | (2006.01) | |

(52) U.S. Cl.
CPC  *G05D 23/19* (2013.01); *A01K 7/02* (2013.01); *A01K 7/027* (2013.01); *A01K 9/00* (2013.01); *A01K 39/04* (2013.01); *A23K 1/009* (2013.01); *F16L 53/00* (2013.01); *F16L 53/002* (2013.01); *Y10T 137/6416* (2015.04)

(58) Field of Classification Search
USPC ............ 119/51.01, 51.5, 52.1, 57.1, 57.92, 119/61.52, 72, 73, 74, 71; 426/53
See application file for complete search history.

(56) References Cited

U.S. PATENT DOCUMENTS

| | | | | |
|---|---|---|---|---|
| 2,906,626 | A | * | 9/1959 | Eagon et al. .................. 426/602 |
| 5,452,683 | A | * | 9/1995 | Poffenroth ....................... 119/73 |
| 5,983,889 | A | * | 11/1999 | Thomas ..................... 126/351.1 |
| 2005/0056226 | A1 | * | 3/2005 | Ruggiero .................... 119/61.52 |
| 2005/0061493 | A1 | * | 3/2005 | Holtzapple ..................... 165/157 |
| 2008/0315152 | A1 | * | 12/2008 | Daly ............................... 252/73 |
| 2009/0107405 | A1 | * | 4/2009 | Hare et al. .................. 119/51.01 |

* cited by examiner

*Primary Examiner* — Shadi Baniani
(74) *Attorney, Agent, or Firm* — Tyson B. Benson; Advent, LLP

(57) ABSTRACT

A hydronic system for heating and/or cooling fluid feed additives passing through a delivery line is disclosed. The system includes a hydronic heating system which will heat fluid passing through a closed loop radiant line which is closely positioned adjacent a portion of the delivery line extending between the fluid delivery system and the target destination. The system also includes a cooling system which will cool the fluid circulating through the radiant line to cool the delivery line and the fluid feed additive therein. The system of this invention prevents the fluid feed additive from freezing during the cold months and cools the same during warm months.

23 Claims, 1 Drawing Sheet

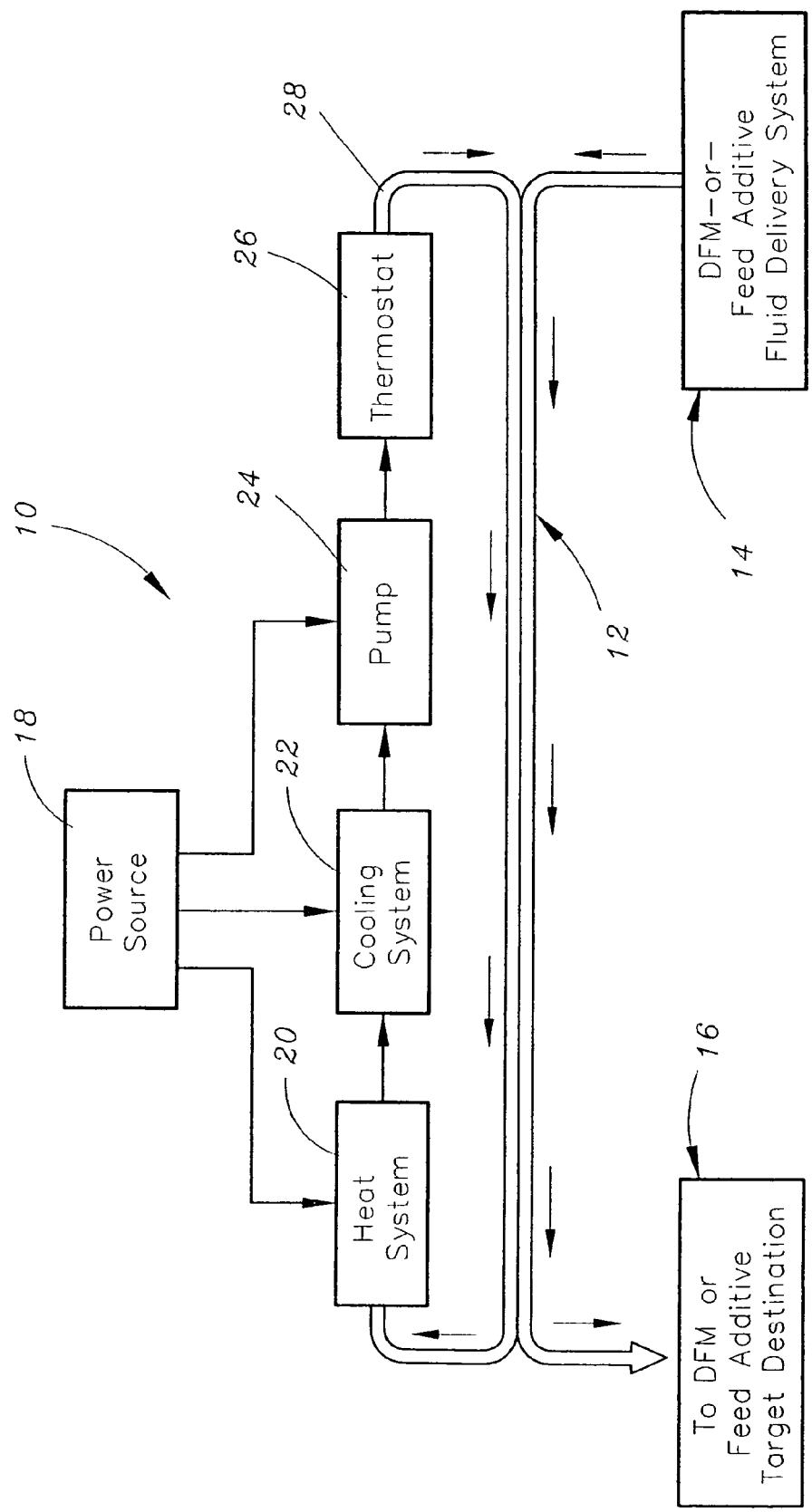

METHOD FOR HEATING AND/OR COOLING AGRICULTURAL RELATED FEED ADDITIVES

BACKGROUND OF THE INVENTION

1. Field of the Invention

This invention relates to a method for heating and/or cooling agricultural related feed additives during their storage and/or delivery process. Even more particularly, the system of this invention provides a method for heating and/or cooling agricultural related feed additives by a hydronic radiant cooling system and a hydronic radiant heating system which cools or heats at least a portion of an animal feed additive fluid delivery line of an animal feed additive fluid delivery system.

2. Description of the Related Art

Agricultural feed additives such as Direct Fed Microbials (DFM), live bacteria products or other fluid feed additive products, are normally pumped directly to the feed mixing destination such as a feed batching system, mixer or feed truck by means of a delivery hose extending from a Direct Fed Microbial (DFM) or feed additive water based delivery system. In the prior art, the feed additives are simply mixed with, or into, a water carrier stream as a means to both dilute and deliver the feed additive to the desired target feed destination, such as a feed batching system, mixer or feed truck. The prior art methods then use compressed air to clear or void the delivery line or hose of both the water and/or feed additive in order to prevent the delivery line or hose from freezing during temperatures below 32° F. Another common prior art method which is used to keep a water based feed additive delivery system from freezing is the use of electrical heat tape. It is believed that none of the prior art methods or systems are convenient to use with those prior art systems having many drawbacks.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In the preferred embodiment, the system of this invention includes an animal feed additive fluid delivery system having a feed additive fluid delivery line extending therefrom to a feed additive target destination. With this hydronic system there is no longer a need to void or clear the DFM or feed additive system delivery lines after each use. With the hydronic heating and cooling system, the feed additive delivery system no longer needs water as a means to dilute and deliver the feed additive prior to its being applied to the feed. But rather the feed additive can now be applied as a concentrated pure form. The feed additive can then be left, in its concentrated, water void, un-contaminated, pure form, stored within its applicators delivery line until it next desired use. The concentrated feed additive will remain at a safe, constant pre-set temperature, such as 70° F. The additive will not freeze nor will it be subjected to excessive heat that could damage the delicate DFM or feed additive held within. The feed additive is now 100% safe and protected from, uncontrollable outside, ambient temperatures.

In the preferred embodiment, a hydronic radiant heating and radiant cooling system is provided for radiantly heating or radiantly cooling at least a portion of the delivery line and the feed additive fluid therein. The hydronic radiant heating and cooling system includes a power source which powers a fluid cooling system for cooling fluid passing therethrough. The system of this invention also includes a fluid heating system powered by the power source for heating fluid passing therethrough. A pump is fluidly connected to the fluid cooling system and the fluid heating system for pumping either the cooled fluid from the fluid cooling system or the heated fluid from the fluid heating system through a radiant line which is positioned adjacent a least a portion of the delivery line whereby either the cooled fluid in the radiant line will cool the fluid feed additive delivery line and the fluid feed additive therein or the heated fluid in the radiant line will heat the fluid feed additive delivery line and the fluid feed additive therein.

In the preferred embodiment, the system includes a thermostat for controlling the temperature of the fluid in the radiant line.

It is therefore a principal object of the invention to provide an agricultural feed additive hydronic system.

A further object of the invention is to provide a hydronic radiant heating and cooling system for radiantly cooling or heating at least a portion of a delivery line extending between an animal feed additive fluid delivery system and a feed additive target destination.

A further object of the invention is to provide a system which prevents the freezing of an animal feed additive fluid delivery line extending from an animal feed additive fluid delivery system to a feed additive target destination.

A further object of the invention is to provide a system for cooling a feed additive fluid delivery line and the feed additive fluid therein.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1 is a schematic of the system of this invention.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

In FIG. 1, the numeral 10 refers generally to the hydronic heating and cooling system of this invention for heating or cooling a feed additive fluid delivery line 12 which extends between a DFM or feed additive fluid delivery system 14 and a DFM or feed additive target destination 16. The target destination may be a direct fed microbial, or a mixer/feed truck. The delivery line 12 may have any length from several feet to more than 100 feet in length. The feed additive comprises a water based, line activated, direct fed microbial bacteria product. The feed additive may also be a non-water based, moisture controlled, live viable, dormant, direct fed microbial product. When the feed additive is a livestock feed ingredient, the livestock feed ingredient is less than 0.1 percent of the total mixed feed volume or weight.

System 10 includes a power source 18 which is connected to a hydronic radiant heating system 20, a hydronic radiant cooling system 22, and pump 24. The hydronic radiant heating system 20 and the hydronic radiant cooling system 22 may be combined as a single unit if so desired. The hydronic radiant heating system 20 and the hydronic radiant cooling system 22 and the pump 24 are a part of a closed circuit controlled by a thermostat 26. In FIG. 1, the numeral 28 refers to a heating/cooling line through which fluid is recirculated as indicated by the arrows in FIG. 1. The line 28 preferably contains water, oil, antifreeze or propylene glycol. As seen in FIG. 1, line 28 is closely positioned adjacent a portion of the delivery line 12 so that the heated fluid within the line 28 will radiantly heat the line 12 and the feed additive therein to prevent the freezing of the fluid feed additive within the delivery line 12. During warmer months, the heating system 20 will not be used but the cooling system 22 will be used to provide cooled liquid or fluid for pumping through the line 28 with the cooled liquid or fluid in the line 28 radiantly cooling the line 12 and the fluid feed additive therein. The thermostat 26 controls the temperature of the cooled fluid or the temperature of the heated fluid.

It can therefore be seen that a novel hydronic radiant heating and/or cooling system has been provided for radiantly heating or radiantly cooling a delivery line and the fluid feed additive therein which extends between a fluid delivery system 14 and a target destination 16. It can therefore be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. A feed system, comprising:
   an animal feed additive fluid delivery system;
   a feed additive fluid delivery line extending from said animal feed additive fluid delivery system to a feed additive target destination;
   said delivery line including an elongated portion;
   a hydronic radiant cooling system;
   said hydronic radiant cooling system comprising:
   a. a power source;
   b. a fluid cooling system powered by said power source for cooling fluid passing therethrough with the cooled fluid being fluidly isolated from the animal feed additive fluid in said delivery line;
   c. said fluid cooling system including a cooling line having an elongated portion which is closely positioned to at least a portion of said elongated portion of said delivery line;
   d. a pump fluidly connected to said fluid cooling system configured to pump the cooled fluid through said cooling line whereby the cooled fluid passing through said elongated portion of said cooling line will radiantly cool said elongated portion of said delivery line and the feed additive fluid in said elongated portion of said delivery line.

2. The feed system of claim 1 wherein a thermostat controls the temperature of the cooling fluid passing through said cooling line.

3. The combination of claim 1 wherein the cooled fluid is recirculated through said fluid cooling system and said cooling line.

4. The combination of claim 1 wherein said delivery line comprises a hose.

5. A feed system comprising:
   an animal feed additive fluid delivery system configured to deliver an animal feed additive;
   a feed additive fluid delivery line extending from said animal feed additive fluid delivery system to a feed additive target destination;
   said delivery line including an elongated portion;
   a hydronic radiant heating system for radiantly heating at least a portion of said delivery line and the feed additive fluid therein;
   said hydronic radiant heating system comprising:
   a. a power source;
   b. a fluid heating system powered by said power source for heating fluid passing therethrough with the heated fluid being fluidly isolated from the animal feed additive fluid in said delivery line;
   c. said fluid heating system including a heating line having an elongated portion which is closely positioned to at least a portion of said elongated portion of said delivery line;
   d. a pump fluidly connected to said fluid heating system configured to pump the heated fluid through said heating line whereby the heated fluid passing through said elongated portion of said heating line will radiantly heat said elongated portion of said delivery line and the feed additive fluid in said elongated portion of said delivery line.

6. The feed system of claim 5, wherein a thermostat controls the temperature of the heating fluid passing through said heating line.

7. The feed system of claim 5 wherein the heated fluid is recirculated through said fluid heating system and said heating line.

8. The combination of claim 5 wherein said heating line contains water.

9. The combination of claim 5 wherein said heating line contains antifreeze.

10. The combination of claim 5 wherein said heating line contains propylene glycol.

11. The combination of claim 5 wherein said heating line contains oil.

12. A feed system comprising:
    an animal feed additive fluid delivery system;
    a feed additive fluid delivery line extending from said animal feed delivery line extending from said animal feed additive fluid delivery system to a feed additive target destination;
    said delivery line including an elongated portion;
    a hydronic radiant heating and cooling system;
    said hydronic radiant heating and cooling system comprising:
    a. a power source;
    b. a fluid cooling system powered by said power source for cooling fluid passing therethrough with the cooled fluid being fluidly isolated from the animal feed additive fluid in said delivery line;
    c. a fluid heating system powered by said power source for heating fluid passing therethrough with the heated fluid being fluidly isolated from the animal feed additive fluid in said delivery line;
    d. a cooling and heating line, having an elongated portion, extending from said cooling and heating systems with said elongated portion thereof being closely positioned adjacent to at least a portion of said elongated portion of said delivery line;
e. a pump fluidly connected to said fluid cooling system and said fluid heating system configured to pump either the cooled fluid from said fluid cooling system or the heated fluid from said fluid heating system through said cooling and heating line whereby either said cooled fluid in said elongated portion of said cooling and heating line will radiantly cool said elongated portion of said delivery line and the animal feed additive fluid therein or will radiantly heat said elongated portion of said delivery line and the animal feed additive fluid therein.

13. The feed system of claim 12 including a thermostat configured to control the temperature of the fluid in said cooling and heating line.

14. The feed system of claim 12 wherein the cooled fluid is recirculated through said fluid cooling system and to said cooling and heating line.

15. The feed system of claim 12 wherein the heated fluid is recirculated through said fluid heating system and said cooling and heating line.

16. The feed system of claim 12 wherein said cooling and heating line contains water.

17. The feed system of claim 12 wherein said cooling and heating line contains antifreeze.

18. The feed system of claim 12 wherein said cooling and heating line contains propylene glycol.

19. The feed system of claim 12 wherein said cooling and heating line contains oil.

20. The feed system of claim 12 wherein the feed additive target destination comprises a mixer/feed truck.

21. The feed system of claim 12 wherein the animal feed additive comprises a livestock feed ingredient that is less than 0.1 percent of the total mixed feed volume or weight.

22. The feed system of claim 12 wherein the animal feed additive comprises a water based, live activated, direct fed microbial bacteria product.

23. The feed system of claim 12 wherein the animal feed additive comprises non-water based, moisture controlled, live viable, dormant, direct fed microbial product.

* * * * *